March 31, 1931.  M. M. KOLLER  1,799,142
METHOD OF TREATMENT OF RESIDUE REMAINING AFTER
EXTRACTING SOLUBLE SUBSTANCES FROM MALT GRAIN
Filed Oct. 12, 1927
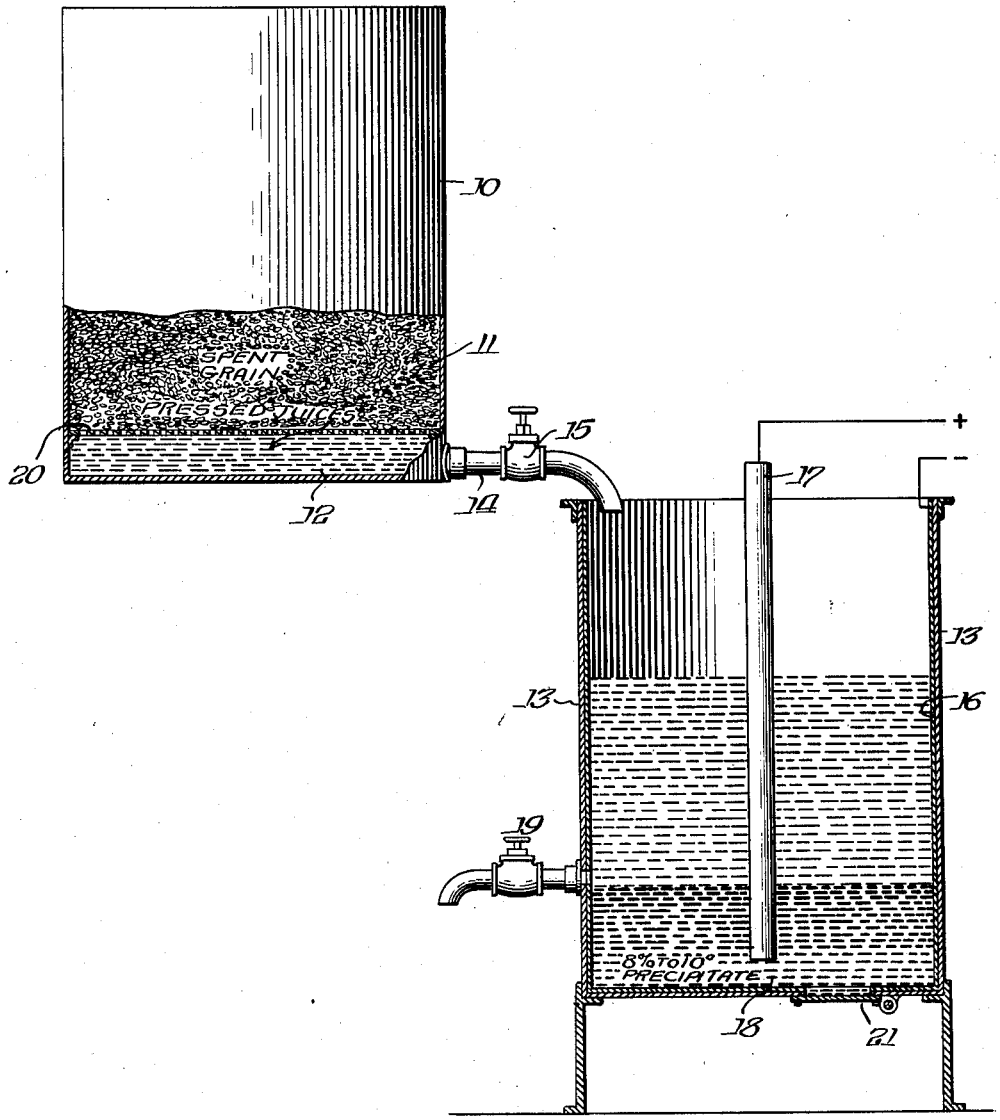
Witness:
Inventor
Margaret M. Koller Patented Mar. 31, 1931

1,799,142

UNITED STATES PATENT OFFICE

MARGARET M. KOLLER, OF ELMHURST, ILLINOIS

METHOD OF TREATMENT OF RESIDUE REMAINING AFTER EXTRACTING SOLUBLE SUBSTANCES FROM MALT GRAIN

Application filed October 12, 1927. Serial No. 225,680.

This invention relates to an improved method of an apparatus for the treatment of residue from food stuff processes wherein the residue has heretofore either been kept in storage tanks until precipitation has taken place in a natural way, or the residue is turned into a sewage disposal plant, or otherwise disposed of as waste material. When kept in treatment tanks and permitted to precipitate in the usual way, a fermentation takes place which in my knowledge has entailed great expense in the installation, maintenance and operation of such tanks; that where the residue was turned into a sewage disposal plant it started to ferment before it was treated and resulted in overflowing the tanks and causing damage and untenable conditions. Where the residue was turned into a neighboring stream it was found to pollute the stream and even to create odors which in the vicinity of the stream, made living conditions highly undesirable.

The residue to which I have reference is that known to those familiar with the art, as "pressed juice" or "underdough", a colloidal, gray colored flocculent substance, being partially liquid refuse from the "spent grain press" which remains after the production of food stuffs from malt-grain, such for example, as the well-known malt extracts. To precipitate the solids out of "pressed juice" in the natural way requires from a week to ten days and during precipitation fermentation takes place which renders the solids unsuitable for any practical use, and not only wastes a material suitable by my discovery for use itself as a food stuff, but makes it impracticable of convenient disposal.

This residue I have found to normally precipitate solids in approximately a ratio of about 8% to 10% of the mass, when treated according to my invention, characterized by substantially entire absence of fermentation or decay, and when treated according to my invention, the precipitated solids are found to be inert, and therefore, valuable as a food stuff, particularly for live stock, and may be combined with the "spent grain" which is another by-product of the processes referred to.

Spent grain is the name given to the hulls and large solid fragments of grain remaining after the production of food stuffs from the grain.

Attempts to remedy the conditions referred to have been made, such, for instance, as treatment with lime or other precipitants, but in a plant producing a residue of say 15,000 gallons daily, the lime treatment alone requires a daily expenditure of $16.00 for precipitants besides requiring the services of men twenty-four hours a day. In addition, the precipitants increase the bulk of the precipitate and destroys its value as food.

The principal object of my invention resides in the provision of an improved process or method of treatment of a food stuff residue subject to fermentation whereby to accelerate precipitation and render the resultant byproduct inert; the process which accelerates precipitation and prevents fermentation; the process which involves the treatment of a food stuff residue ordinarily inedible to render the same suitable as a food stuff; the provision of an improved process and apparatus for carrying out the process which includes the treatment of a waste product which is ordinarily inedible and which according to the process of this invention, may be rendered suitable for use as an animal food stuff; the provision of an improved process of electrically treating a residue material for rendering the same inert; the improved process of treating a suspended residue for precipitation of the valuable portions thereof and for preventing fermentation thereof; and the provision of an improved process for treating the residue remaining after the extraction of soluble constituents from malt grain for rendering the residue inert and suitable for use as a food stuff.

In the drawings, I have illustrated diagrammatically one apparatus which may be conveniently employed for carrying out the process.

The process involved in the present invention resides in an electrical treatment of a residue which, as pointed out above, ordinarily is disposed of as waste material. In brief, the residue results from a process of treating grain-malt to produce a product suitable as a food stuff and this residue consists generally of the materials known as "spent-grain" and "pressed juice". The spent grain is ordinarily drawn off readily, owing to its natural separation in the process from the pressed juice, but the pressed juice is the residue which, up to the present invention, has been unsuitable for any useful purpose and has been ordinarily disposed of as waste. In my invention, I withdraw the pressed juice and deposit it in a suitable tank in amount of say, 5,000 gallons. This tank is equipped with one or more positive and one or more negative electrodes and an electric current is allowed to flow through the waste material, that is, the pressed juice, as an electrolyte. I have found by test tube experiments, that employment of one and one-half volts direct current will in about 8 hours completely change the sample of pressed juice from an acid state to an alkaline state, that is, render the sample of material inert and at the same time precipitate the solids in the amount of from eight to ten percent. Where the material is placed in a tank, it is necessary that the voltage be increased gradually as the precipitation proceeds, for the reason that the water or other liquid left by the process of precipitation increases the resistance of the flow of the electric current and, therefore, necessitates gradual increase in the voltage so that a substantially constant current will be caused to flow through the electrolyte.

The use of a generator is necessary to furnish the required voltage, the latter depending upon the resistance of the material.

The appearance of the precipitate is substantially the same as where it is allowed to settle in the natural manner and the electrolytic treatment of my invention results in a complete sedimentation of the suspended particles.

The steps of the process are therefore to draw off the pressed juice from the tank in which it is deposited by the food stuff process referred to and deposit this pressed juice in a suitable tank for treatment by my invention. I then, apply the direct current at a voltage determined by experiment to obtain the best results in the precipitation of the solids. In order to insure a constant current flowing I increase the voltage as precipitation proceeds. After the precipitation is complete, it will be found that the solids thus precipitated may be mixed with the spent grain of the first mentioned process for use as food for animals.

I find that the tank in which the precipitation takes place, is best constructed as shown in the drawings, and is preferably made with a tin negative pole and a steel positive pole. I find that the precipitate becomes alkaline first at the negative pole after about four hours, and becomes completely alkaline at the end of eight hours treatment.

In the drawings I have shown a mash tub or tank 10 in which is indicated at 11 the so-called spent grain from the food stuff process first referred to and the pressed juice is indicated at 12. A perforated false bottom 20 permits the pressed juice 12 to pass therethrough, leaving the spent grain 11 to collect on the false bottom.

The kettle or tank in which my improved process is carried out is indicated at 13 and a conduit 14 controlled by a valve 15 serves to conduct the pressed juice or underdough 12 from the tank 10 to the tank 13. The inner surface of the tank indicated at 16 is preferably lined with tin as the negative electrode and a positive electrode 17 of steel is introduced into the tank so as to be completely surrounded by contents thereof. Best results are obtained by using decarbonized steel in the electrode 17. Upon completion of the precipitation process, the supernatent liquid is drawn off through the valve 19. The precipitate in the amount of eight to ten percent indicated at 18 can thus be drawn off through a door 21 and if desired, conducted away and placed in storage or mixed with the spent grain in a proper proportion to serve with said spent grain as live stock feed.

Thus it will be seen that from my invention, I am enabled to convert an otherwise waste material into a valuable and useful by-product for the purpose set forth.

I claim:

A process of producing a food stuff which comprises collecting the residue remaining after extracting soluble constituents from malt grain, separating the acid "pressed juice" from the "spent grain", and flowing an electric current through said juice for a sufficient period of time to effect a substantially complete precipitation of the suspended solids in said juice and to render the said juice alkaline in character whereby to cause said solids to become inert to fermentation.

In testimony whereof I have affixed my signature.

MARGARET M. KOLLER.